(12) United States Patent
Sidorov et al.

(10) Patent No.: US 11,688,523 B2
(45) Date of Patent: Jun. 27, 2023

(54) SYSTEM FOR CONFINING AND COOLING MELT FROM THE CORE OF A WATER-MODERATED NUCLEAR REACTOR

(71) Applicant: JOINT-STOCK COMPANY "ATOMENERGOPROEKT", Moscow (RU)

(72) Inventors: Aleksandr Stalevich Sidorov, Moscow (RU); Tatyana Yaropolkovna Dzbanovskaya, Moscow (RU); Mihail Aleksandrovich Roshchin, Moscow (RU)

(73) Assignee: JOINT-STOCK COMPANY "ATOMENERGOPROEKT", Moscow (RU)

( * ) Notice: Subject to any disclaimer, the term of this patent is extended or adjusted under 35 U.S.C. 154(b) by 0 days.

(21) Appl. No.: 17/256,575

(22) PCT Filed: Dec. 28, 2018

(86) PCT No.: PCT/RU2018/000899
§ 371 (c)(1),
(2) Date: Dec. 28, 2020

(87) PCT Pub. No.: WO2020/046165
PCT Pub. Date: Mar. 5, 2020

(65) Prior Publication Data
US 2021/0202118 A1 Jul. 1, 2021

(30) Foreign Application Priority Data

Aug. 29, 2018 (RU) .................................. 2018131157

(51) Int. Cl.
*G21C 9/016* (2006.01)
*G21C 15/18* (2006.01)

(52) U.S. Cl.
CPC ............. *G21C 9/016* (2013.01); *G21C 15/18* (2013.01)

(58) Field of Classification Search
CPC ....... G21C 9/016; G21C 13/10; G21C 13/024
See application file for complete search history.

(56) References Cited

U.S. PATENT DOCUMENTS

| 4,036,688 | A | * | 7/1977 | Golden | .................. | G21C 9/016 |
| | | | | | | 376/280 |
| 4,302,290 | A | * | 11/1981 | Mazur | .................. | G21C 13/024 |
| | | | | | | 376/287 |
| 5,263,066 | A | * | 11/1993 | Szabo | .................... | G21C 9/016 |
| | | | | | | 376/280 |

FOREIGN PATENT DOCUMENTS

| JP | 4761592 B2 | * | 8/2011 | ............. G21C 15/18 |
| RU | 2165106 C2 | * | 4/2001 | |

(Continued)

*Primary Examiner* — Jack W Keith
*Assistant Examiner* — Joshua C Devorkin
(74) *Attorney, Agent, or Firm* — J. Miguel Hernandez; James R. Gourley; Carstens, Allen & Gourley, LLP

(57) ABSTRACT

System for confining and cooling melt from the core of a water-moderated nuclear reactor comprising a melt trap. The melt trap is installed in the reactor vessel bottom and provided with a cooled containment, consisting of outer and inner housings between which there is a sealant, and the filler for the melt dilution placed in the melt trap inner body. The melt trap inner body has a damper consisting of a central mantle, bearing ribs connected with the central mantle, titled plates, placed between the bearing ribs, the stops providing fastening of the damper to the melt trap body.

2 Claims, 1 Drawing Sheet

(56) References Cited

FOREIGN PATENT DOCUMENTS

| RU | 2165652 C2 * | 4/2001 | |
|----|--------------|--------|---|
| RU | 2575878 C1   | 2/2016 | |
| RU | 2576516 C1 * | 3/2016 | ............ G21C 13/10 |
| RU | 2576516 C1   | 3/2016 | |
| RU | 2576517 C1   | 3/2016 | |

* cited by examiner

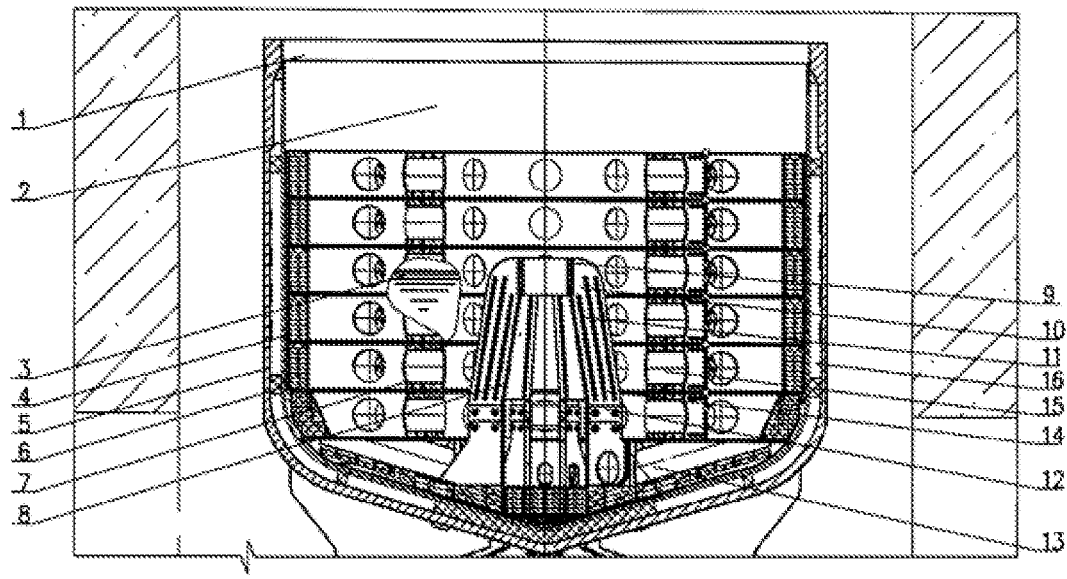

SYSTEM FOR CONFINING AND COOLING MELT FROM THE CORE OF A WATER-MODERATED NUCLEAR REACTOR

CROSS-REFERENCE TO RELATED DISCLOSURE

This application is a U.S. National Stage of International Application No. PCT/RU2018/000899, filed on Dec. 28, 2018, and published as WO 2020/046165 on Mar. 5, 2020, titled "System for Confining and Cooling Melt from the Core of a Water-Moderated Nuclear Reactor," which claims priority to RU 2018131157 filed on Aug. 29, 2018. Each application, publication, and patent listed in this paragraph are hereby incorporated by reference in their entireties.

The invention relates to nuclear engineering, in particular, to systems that ensure the safety of nuclear power plants (NPP), and can be used in severe accidents that lead to the core meltdown, nuclear reactor pressure vessel destruction and the release of the melt into the space of the NPP containment.

The greatest radiation hazard is represented by accidents with core meltdown, which can occur in various combinations of failures (destruction of equipment components) of active and passive safety systems and normal operation systems, or in conditions of the total power loss of the NPP, and the inability to supply power within the time period established by the NPP design to ensure the emergency core cooling.

In case of such accidents occurrence, the core meltdown—corium, melting the core internals and the reactor vessel, flows out of it and, due to the residual heat generation remaining in it, can violate the integrity of the NPP containment—the last barrier to the release of radioactive products into the environment.

To eliminate this, it is necessary to localize the corium that has flowed out of the reactor vessel and ensure its continuous cooling, until the complete crystallization of all corium components. This function is performed by the water-cooled nuclear reactor core melt cooling and confinement system, which prevents damage to the NPP containment and, thereby, protects the population and the environment from radiation exposure in severe accidents of nuclear reactors.

The water-cooled water-moderated nuclear reactor core melt cooling and confinement system [1] comprising a melt trap, which is installed in the reactor vessel bottom and provided with a cooled containment as the multilayer vessel, consisting of the outer and inner walls, between which there is a sealant, and the filler for the melt dilution, placed in the specified multi-layered vessel, is already known.

The drawback of the system is low reliability due to the design features of the melt trap, in which corium, flowing out of the reactor vessel, under the influence of both excess pressure in the reactor vessel and hydrodynamic pressure due to the difference in levels between the marks of corium blowdown and intake in the melt trap, has a thermomechanical effect on the base of the trap body, its conical and torus parts, which leads to a high concentration of heat in a confined area, resulting in overheating of the trap body bottom part, which under the influence of thermomechanical effect may collapse.

The water-cooled water-moderated nuclear reactor core melt cooling and confinement system [2] comprising a melt trap, which is installed in the reactor vessel bottom and provided with a cooled containment as the multilayer vessel, consisting of the outer and inner walls, between which there is a sealant, there are the bearing ribs between the inner and outer layers, and the filler for the melt dilution, placed in the specified multi-layered vessel, is already known.

The drawback of the system is low reliability due to the design features of the melt trap, in which corium, flowing out of the reactor vessel, under the influence of both excess pressure in the reactor vessel and hydrodynamic pressure due to the difference in levels between the marks of corium blowdown and intake in the melt trap, has a thermomechanical effect on the base of the trap body, its conical and torus parts, which leads to a high concentration of heat in a confined area, resulting in overheating of the trap body bottom part, which under the influence of thermomechanical effect may collapse.

The water-cooled water-moderated nuclear reactor core melt cooling and confinement system [3] comprising a melt trap, which is installed in the reactor vessel bottom and provided with a cooled containment as the multilayer vessel, consisting of the outer and inner walls, between which there is a sealant, and the filler for the melt dilution, placed in the specified multi-layered vessel, is already known.

The drawback of the system is low reliability due to the design features of the melt trap, in which corium, flowing out of the reactor vessel, under the influence of both excess pressure in the reactor vessel and hydrodynamic pressure due to the difference in levels between the marks of corium blowdown and intake in the melt trap, has a thermomechanical effect on the base of the trap body, its conical and torus parts, which leads to a high concentration of heat in a confined area, resulting in overheating of the trap body bottom part, which under the influence of thermomechanical effect may collapse.

The technical result of the claimed invention is to increase the reliability of the water-cooled water-moderated nuclear reactor core melt cooling and confinement system.

The object to be solved by the claimed invention is to increase the efficiency of heat removal from the melt and increase the structure reliability.

The problem is solved due to the fact, that in the water-cooled water-moderated nuclear reactor core melt cooling and confinement system comprising a melt trap, which is installed in the reactor vessel bottom and provided with a cooled containment, consisting of outer and inner housings between which there is a sealant, and the filler for the melt dilution placed in the melt trap inner body, according to the invention, in the melt trap inner body has additionally placed a damper consisting of a central mantle, bearing ribs connected with the central mantle, tilted plates, placed between the bearing ribs, the clamps providing fastening of the damper to the melt trap body.

Additionally, in the water-cooled water-moderated nuclear reactor core melt cooling and confinement system $h_{plate}$ thickness of the damper tilted plates is in the following ratio with the damper bearing ribs thickness: $0.1\, h_{rib} < h_{plate} < 1.0\, h_{rib}$, where $h_{rib}$ is the damper bearing ribs thickness.

Additionally, in the water-cooled water-moderated nuclear reactor core melt cooling and confinement system, the melt trap body in the bottom part of the inner side has an internal radial support resting on the body bottom and connected with it.

Additionally, in the water-cooled water-moderated nuclear reactor core melt cooling and confinement system, the body inner radial supports are connected with the damper by means of clamps, thus, each of the radial supports and the clamps have round or oval holes.

One characteristic feature of the claimed invention is the damper installed inside the melt trap body, consisting of the central mantle, bearing ribs connected to the central mantle, tilted plates located between the bearing ribs, clamps that secure the damper to the melt trap body, which protects the melt trap bottom from destruction by the core melt jets and flying objects, for example, fragments of the reactor vessel bottom, and also provides passive hydro-mechanical protection against direct exposure to superheated melt jets of the core to the part of the filler located in the body bottom part, due to the the melt kinetic energy uniform distribution over the filler.

Another characteristic feature of the claimed invention is that the damper tilted plates $h_{plate}$ thickness is located in the following ratio with the damper bearing ribs thickness: $0.1\ h_{rib} < h_{plate} < 1.0\ h_{rib}$, where $h_{pe6}$ is the damper bearing ribs thickness that allows to provide effective rejection of the core melt overheated jets from direct contact with the body bottom central part. At the same time, if the thickness of the ribs is small and equals to, for example, from 10 to 30 mm, then it is necessary to choose ratios close to $1.0\ h_{rib}$, otherwise, the tilted plates will not be able to deflect the core melt superheated jets.

One more characteristic feature of the claimed invention is that the melt trap body in the bottom part on the inner side has internal radial supports resting on the body bottom and connected to it, which provides radial temperature extensions of the trap body and removes the risk of the body bottom destruction with non-axisymmetric temperature loading of the bottom, in contrast to the use of ring, sector, chord supports, which create additional mechanical radial and azimuth stresses leading to non-design deformations of the bottom, to the formation of cracks and to the violation of the structural integrity.

Another characteristic feature of the claimed invention is that the body internal radial supports are connected to the damper by means of clamps, while each of the radial supports and the clamp have round or oval holes with a guaranteed gap that ensures the operation of the clamp round or oval components not only for cutting and bearing strain, but also for bending. For example, round components can be studs, fingers, shafts, or pipes, for which energy absorption is also provided by the bearing strain.

FIG. 1 shows the water-cooled water-moderated nuclear reactor core melt cooling and confinement system, with a damper and filler installed in the trap, made in accordance with the claimed invention.

The claimed invention is functioning as follows.

FIG. 1, in accordance with the claimed invention, shows the water-cooled water-moderated nuclear reactor core melt cooling and confinement system (1) containing the melt (3) trap (2), which is installed in the reactor vessel bottom and consisting of inner and outer bodies (4, 5) between which there is a sealant (6), filler (7) for the melt (3) dilution, placed in the melt (3) trap (2) inner body (4), wherein in the melt (3) trap (2) inner body (4) is additionally placed the damper (8), consisting of the central mantle (9), bearing ribs (10) connected with the central mantle (9), tilted plates (11) located between the bearing ribs (10), clamps (12) providing fastening of the damper (8) to the melt (3) trap (2) body.

At the moment of the reactor vessel destruction, the core melt (3) under the action of hydrostatic and overpressure begins to flow into the inner body (4) of the melt (3) trap (2) and comes into contact with the filler (7).

The filler (7) provides volumetric diffusion of the corium melt (3) within the trap (2), and is designed to the corium full oxidation and its dilution in order to reduce the volumetric energy release and increase of heat transfer surface of the energy-releasing corium with the melt (3) trap (2) outer layer, and also contributes to creating conditions for the levitation of the fuel containing corium fractions over the steel layer. The filler (7) can be made of steel and oxide components containing iron, aluminum, and zirconium oxides, with channels for redistributing corium not only in the cylindrical part, but also in the bottom conical bulk.

Steel and oxide components are completed in cylindrically-shaped cassettes. Typically, the filler (7) contains at least the first cassette (13) mounted on the trap body bottom, the second cassette (14) positioned above the first cassette (13), and the third cassette (15) mounted above the second cassette (14). The third cassette (15), in turn, may consist of several cassettes mounted on the top of each other.

The tilted plates (11) of the damper (8) located between the bearing ribs (10) are installed from 1 to 5 pieces, parallel to each other in each segment between the bearing ribs (10). The number of the tilted plates (11) more than 5 does not give an additional redistributing effect due to the fact that the thickness of the tilted plates (11) shall be reduced to ensure the desired angle of the plates (11) tilt, which ensures the deflection of the core melt (3) superheated jets towards the filler (7).

The number of the radial supports (16) of the inner body (4) is set in the range from 3 to 10 pieces. The number of the radial supports (16) of the inner body (4) less than 3 does not provide effective work to absorb the kinetic impact energy, since in this case the impact area is not redistributed along the body bottom, but is concentrated in its local areas, which may lead to its destruction. The number of radial supports (16) of the inner body (4) more than 10 does not increase redistributive effect, requires reducing the bearing ribs (10) thickness, which negatively affects their ability to absorb and redistribute kinetic impact energy caused by the reactor vessel bottom debris falling and to absorb the energy of the core melt (3) jets during the melt (3) blowdown out of the reactor vessel.

The damper (8), at the initial stage of discharging the core melt (3) from the reactor vessel into the filler (7), protects the first cassette (13) from destruction by the core melt jets (3) and flying objects (fragments of the reactor vessel bottom, fragments of in-vessel devices, fragments of fuel assemblies, fragments located above the thermal protection), as well as the second cassette (14) and the third cassette (15), from those that are directly installed on the second cassette (14), from destruction by flying objects.

In addition to mechanical protection against flying objects, the damper (8) provides passive hydro-mechanical protection against the direct impact of the superheated core melt jets (3) on the first cassette (13). Destructing and melting during the core melt (3) blowdown from the reactor vessel, the damper (8) redistributes the kinetic energy of the melt (3) between the first, the second and the third cassettes (13, 14, 15). Energy is redistributed when a large volume of melt (3) containing mainly liquid superheated steel enters the first peak discharge due to the hydro-mechanical deflection of the molten metal by the damper planes (8). The damper planes (8) tilt orientation and angle are selected so that the melt jets (3) are deflected towards the vertical surfaces of the second and third cassettes (14, 15).

For example, when 60 tons of superheated steel are delivered in a peak discharge for 30 seconds, the damper (8) survivability is about 10 seconds, but this time is sufficient to limit the first shock discharge of molten superheated steel into the first cassette (13) until a safe melt level is formed above it (3) and redirect part of the kinetic energy of the melt (3) to the second and third cassettes (14, 15), from which the melt (3) increases its level above the first cassette (13), protecting it from subsequent direct impact kinetic energy of melt jets (3) and flying objects.

In the process of superheated steel discharge, when the melt jets fall axisymmetric or non-axisymmetric (3), the filler (7) is partially sealed. In this case, the damper (8) performs the function of a hydrodynamic damper, providing a directional collision of the melt jets (3), almost horizontally releasing from the macroporous filler (7) components, with vertical jets deflected by the tilted plates (11) of the damper (8) in the radial direction.

The use of the damper as part of a melt trap made it possible to increase the reliability of the melt confining system by redistributing energy, due to the hydro-mechanical deflection of the molten metal by the damper planes.

Information Source:
1. Russian Patent No. 2576516, IPC G21C 9/016, priority dated Dec. 16, 2014;
2. Russian Patent No. 2576517, IPC G21C9/016, priority dated Dec. 16, 2014;
3. Russian Patent No. 2575878, IPC G21C 9/016, priority dated Dec. 16, 2014 (prototype).

The invention claimed is:

1. A system for confining and cooling melt from a core of a water-moderated nuclear reactor comprising a melt trap, a damper, and a bed portion;
   wherein the melt trap is configured to be installed under the reactor vessel bottom portion;
   wherein the melt trap comprises an outer wall, an inner wall, and outer and inner housings between which there is a sealant, wherein further the melt trap has upwardly-extended radial supports, the upwardly-extended radial supports being provided in a bottom part of the melt trap and connected with the inner wall of the melt trap;
   wherein the filler is made of a sacrificial material positioned in the melt trap;
   wherein the damper is installed in the bed portion, the damper comprising a central mantle, bearing ribs connected with the central mantle, tilted plates placed between respective ribs of the bearing ribs, and clamps configured to fasten the damper to the melt trap, the damper having a tapered portion and being configured so that the tapered portion points upwardly, wherein further the upwardly-extended radial supports of the melt trap are connected with the damper by means of the clamps, and each of the upwardly-extended radial supports of the melt trap and the clamps have circular or oval holes to facilitate connection between the upwardly-extended radial supports and the clamps.

2. The system for confining and cooling melt from a core of a water-moderated nuclear reactor according to claim 1, characterized in that $h_{plate}$, the thickness of each of the tilted plates of the damper, is a function of the thickness of each of the bearing ribs of the damper as $0.1\, h_{rib} < h_{plate} < 1.0\, h_{rib}$, where $h_{rib}$ is the thickness of each of the bearing ribs of the damper.

* * * * *